(12) United States Patent
Windpassinger et al.

(10) Patent No.: US 6,340,196 B1
(45) Date of Patent: Jan. 22, 2002

(54) MOTOR-VEHICLE CONVERTIBLE TOP

(75) Inventors: Martin Windpassinger, Hauzenberg; Manfred Kasparak, Neureichenau, both of (DE)

(73) Assignee: Parat Automotive Schonenbach GmbH + Co. KG, Remscheid (DE)

( * ) Notice: Subject to any disclaimer, the term of this patent is extended or adjusted under 35 U.S.C. 154(b) by 0 days.

(21) Appl. No.: 09/688,265

(22) Filed: Oct. 13, 2000

(30) Foreign Application Priority Data

Oct. 15, 1999 (DE) .......................... 199 49 888

(51) Int. Cl.[7] .................................. B60J 7/12
(52) U.S. Cl. ..................... 296/107.11; 296/107.04; 296/107.06
(58) Field of Search ............... 296/107.01, 107.04, 296/107.06, 107.09, 107.11, 107.12, 107.15, 108, 116, 118, 214

(56) References Cited

U.S. PATENT DOCUMENTS

| | | | |
|---|---|---|---|
| 2,455,926 A | * 12/1948 | Gessler et al. | 296/211 |
| 2,823,951 A | * 2/1958 | Stahl | 296/214 |
| 2,879,105 A | * 3/1959 | Stahl | 296/214 |
| 3,276,814 A | * 10/1966 | Podolan | 135/88.09 |
| 3,642,317 A | * 2/1972 | Swindlehurst | 296/214 |
| 4,323,276 A | * 4/1982 | Hira et al. | 296/214 |
| 4,964,668 A | 10/1990 | Hofmann | 296/107.06 |
| 5,297,838 A | * 3/1994 | Cziptschirsch | 296/214 |
| 5,511,844 A | * 4/1996 | Boardman | 296/107.11 |
| 6,000,749 A | * 12/1999 | Adam et al. | 296/214 |
| 6,082,807 A | 7/2000 | Hartmann et al. | 296/107.07 |

FOREIGN PATENT DOCUMENTS

| | | |
|---|---|---|
| DE | 6944515 | 5/1970 |
| DE | 92 06 366.7 | 9/1992 |
| DE | 92 09 122.9 | 12/1992 |
| DE | 93 04 248.5 | 9/1994 |
| DE | 29718206 U1 | 4/1998 |

* cited by examiner

*Primary Examiner*—Joseph D. Pape
*Assistant Examiner*—Patricia L. Engle
(74) *Attorney, Agent, or Firm*—Herbert Dubno; Andrew Wilford (57) ABSTRACT

A motor-vehicle convertible top has a flexible and waterproof outer layer defining a roof having edges and an inner surface, a pair of sides joined at the edges to the roof, and a rear wall extending between the sides and a rear edge of the roof. A heat- and sound-insulating inner layer of a foamable plastic is bonded directly to the inner surface of the roof and inner surfaces of the sides. A pair of reinforcing bands extending along the edges are fixed to the layers. A plurality of crosswise rigid reinforcing struts extend between the bands and secured to the inner layer. The outer layer has a textile inner surface to which the inner layer is directly bonded. The inner layer is molded in place in a closed mold under 140 bar to 150 bar pressure, so that it is integrally united with the outer layer. The inner layer is polyurethane and has a Shore D hardness of about 40 and a polyol:isocyanate ratio of about 100:38 by weight. Furthermore the inner layer has a thickness of between 2 mm and 6 mm. A roof liner is bonded to mounting strips, which are then attached to the struts.

12 Claims, 8 Drawing Sheets

MOTOR-VEHICLE CONVERTIBLE TOP

FIELD OF THE INVENTION

The present invention relates to a convertible-type motor vehicle. More particularly this invention concerns a folding roof or top for such a motor vehicle.

BACKGROUND OF THE INVENTION

A standard convertible roof or top comprises a folding framework carrying an outer layer formed of a waterproof, normally plastic, fabric, an inner liner forming the head liner, and an intermediate layer primarily intended for preventing the transmission of sound and heat between the inside and outside. The framework normally includes a plurality of crosswise bows or struts that support the layers and that allow the top to go from a folded down position normally recessed behind the passenger compartment to an up position stretched over the passenger compartment and connected to the upper edge of the windshield.

U.S. Pat. No. 4,964,668 describes such a vehicle top where the outer layer is a skin stretched over the struts which support the inner layer. The outer layer rests virtually directly on the support struts so that there is no insulation at these locations. In addition the outer layer is formed of stitched-together panels which require meticulous treatment to avoid leakage.

German utility model 297 18 206 describes another top where mounting strips secure the support struts directly to the outer layer and the intermediate layer is pinched between the outer layer and the struts. The top structure is fairly complex, requiring many steps to secure the various parts together. In the finished top there is a thermal bridge between the outer layer and the struts formed by the mounting strips.

Further arrangements described in German utility models 69 445 15, 92 06 366, 92 09 122, and 9304 248 are similarly complex. Their assembly is a complex operation and they often leave sites for water or heat to get through the top. The support struts are secured to the outer layer from which the intermediate insulating layer is suspended, or the latter is itself mounted on the struts.

OBJECTS OF THE INVENTION

It is therefore an object of the present invention to provide an improved motor-vehicle convertible top.

Another object is the provision of such an improved motor-vehicle convertible top which overcomes the above-given disadvantages, that is which is of simple construction and which provides excellent insulation and water resistance.

SUMMARY OF THE INVENTION

A motor-vehicle convertible top has according to the invention a flexible and waterproof outer layer defining a roof having edges and an inner surface, a pair of sides joined at the edges to the roof, and a rear wall extending between the sides and a rear edge of the roof. A heat- and sound-insulating inner layer of a foamable plastic is bonded directly to the inner surface of the roof and inner surfaces of the sides. A pair of reinforcing bands extending along the edges are fixed to the layers. A plurality of crosswise rigid reinforcing struts extend between the bands and secured to the inner layer.

The insulating layer according to the invention is therefore secured directly to the outer layer so that no separate system is needed to retain it in place. In addition the fact that the inner layer runs between the outer layer and the struts means that the thermal- and sound-insulating properties of this inner layer are effective throughout the top, there only being very limited areas where the inner surface of the outer layer is not covered by the insulating inner layer. The molded-in-place foam insulating layer of this invention is extremely effective so that it can be fairly thin and still as effective as the much thicker prior-art systems. Such an arrangement is, of course, equally applicable to other similar uses, for instance in a sun roof.

The outer layer has a textile inner surface to which the inner layer is directly bonded. The inner layer is molded in place in a closed mold under 140 bar to 150 bar pressure, so that it is integrally united with the outer layer. The inner layer is polyurethane and has a Shore D hardness of about 40 and a polyol:isocyanate ratio of about 100:38 by weight. Furthermore the inner layer has a thickness of between 2 mm and 6 mm.

With the system of this invention the outer layer seams are covered and sealed by the inner layer. The closed-cell polyurethane foam used as insulating layer has excellent water-proofing capacities, and bonding it to the inner face of the outer layer effectively seals any potential leak sites. This eliminates any complex extra steps of sealing these seams, for instance by thermally bonding a sealing strip over the inner face at each seam. Furthermore the fact that the inner layer is directly bonded to the outer layer means that this outer layer is stiffened substantially and therefore will not bulge outward during high-speed travel as is common with a skin-type outer layer.

The reinforcing bands are provided with molded-on plastic formations engaged around ends of the struts. In fact these bands can be imbedded along their entire lengths in the inner layer. Since the inner layer lies between the struts and the outer layer, these struts are much less visible from outside, giving the top a smooth shape that is both attractive and aerodynamically efficient. This is particularly true for the strut at the rear end of the roof part where a smooth transition to the back top panel is ensured.

The bands have outer faces turned toward the outer layer and provided with a plastic layer. Furthermore the plastic layer on the bands has interrupted regions so that the bands fold readily at the regions. This plastic layer can be the same as the inner layer and is thinned but not altogether eliminated at the bend zones so that the insulating and sealing effect is not lost altogether.

The inner layer according to the invention is unitarily formed with formations fixed to the struts. These formations are ribs extending along and engaging the struts. Screws or other fasteners can be used to secure the struts in place. Alternately mounting formations such as rubber bands or tapes can be fixed to the struts and imbedded in the inner layer.

The top according to the invention has a roof liner having an inner surface provided with bonded plastic strips in turn having formations fixed to the struts. Thus the roof liner is not attached to the outer or intermediate layer, but to the struts, once again preventing heat or noise from being transmitted through the top in accordance with the invention.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
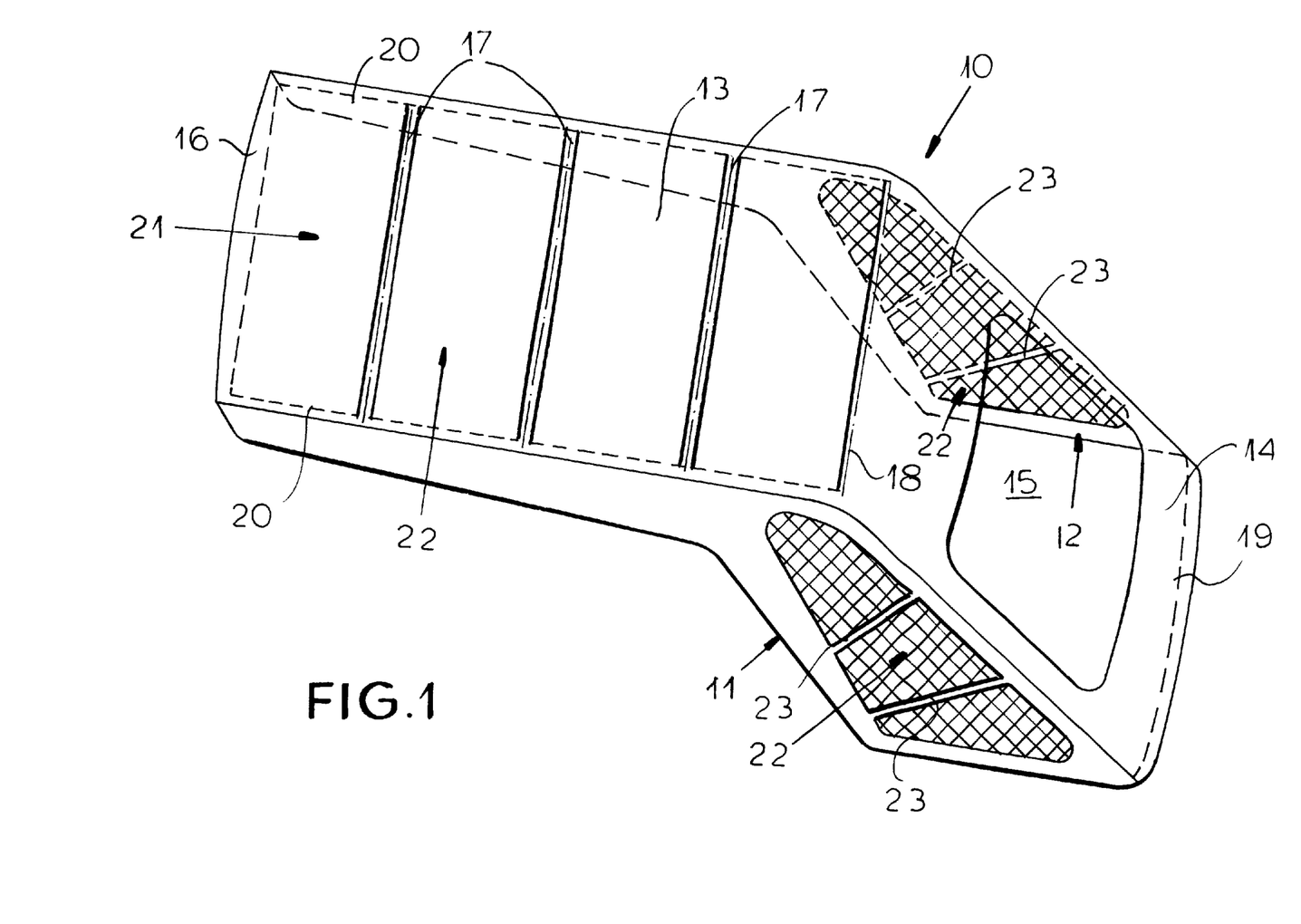
FIG. 1 is a partly diagrammatic small-scale perspective view of the convertible top according to the invention.

As seen in FIG. 1 a convertible top 10 according to the invention has a pair of closed sides 11 and 12, a roof 13, and a rear wall 14 provided with a window 15 secured in place as described in U.S. Pat. No. 6,082,807. A front bar 16 is secured by unillustrated clamps to the upper edge of an unillustrated windshield in an up or closed position. Metal transverse hoops or struts 17 extend between the sides 11 and 12 and one such strut 18 defines the rear of the roof 13 and top of the rear wall 14 while another such strut 19 defines the rear-wall lower edge. Reinforcing bands 20 extend along the corners where the sides 11 and 12 meet the roof 13 and rear wall 14.

According to the invention the top 10 is covered with an outer layer 21 comprised of an outer lamina of polyacrylate, an intermediate lamina of rubber, polyurethane, or a butyl, and an inner textile lamina or web of polyester or a mixture of cotton and polyester. In the drawing the three laminae are not shown separately as they are standard. This outer layer 21 needs to be impervious to water and gas. It is important according to the invention that its innermost face 21a (FIG. 4) be formed by a textile.

Figure 2:
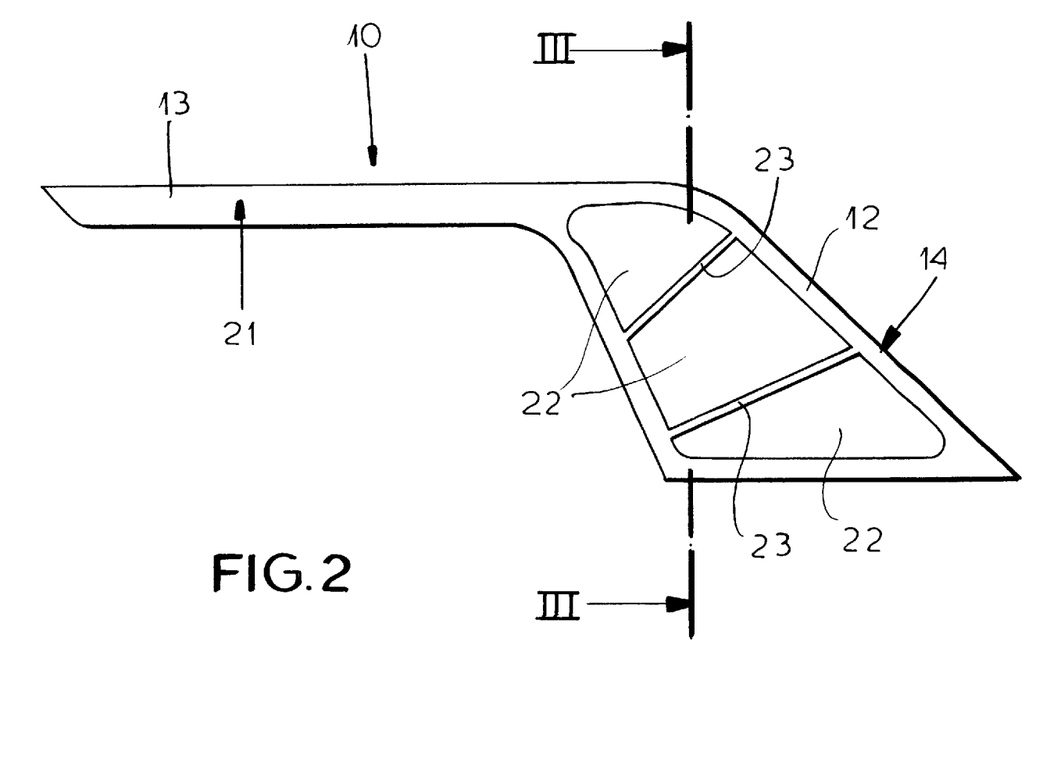
FIG. 2 is a side view of the top.
Figure 3:
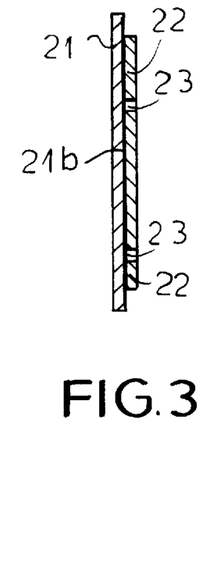
FIG. 3 is a section taken along line III—III of FIG. 2.

FIG. 1 shows how the roof part 13 and the sides 11 and 12 are provided with an inner insulating layer 22 shown by hatching and formed of a molded-in-situ closed-cell polyurethane. This insulating layer 22 extends over the entire inner surface 21a of the outer layer 21 except as shown in FIGS. 2 and 3 at zones 23 in the side walls 11 and 12. The layer 22 covers seams 21b (FIG. 3) in the outer layer 21 and, since the material of the layer 22 is waterproof, it seals these regions and eliminates any need for special treatment here. The zones 23 are intended to promote folding at these locations, as the top 10 must fold in a predetermined manner in order to fit in its compartment in the vehicle when down. The inner layer 22 is comprised of a two-component polyurethane that is applied in a mold at a high pressure of 140 bar to 150 bar to the inner face 21a so that it bonds directly and unitarily thereto. It has a thickness d of between 2 mm and 6 mm and a Shore D hardness of about 40.

Figure 4:
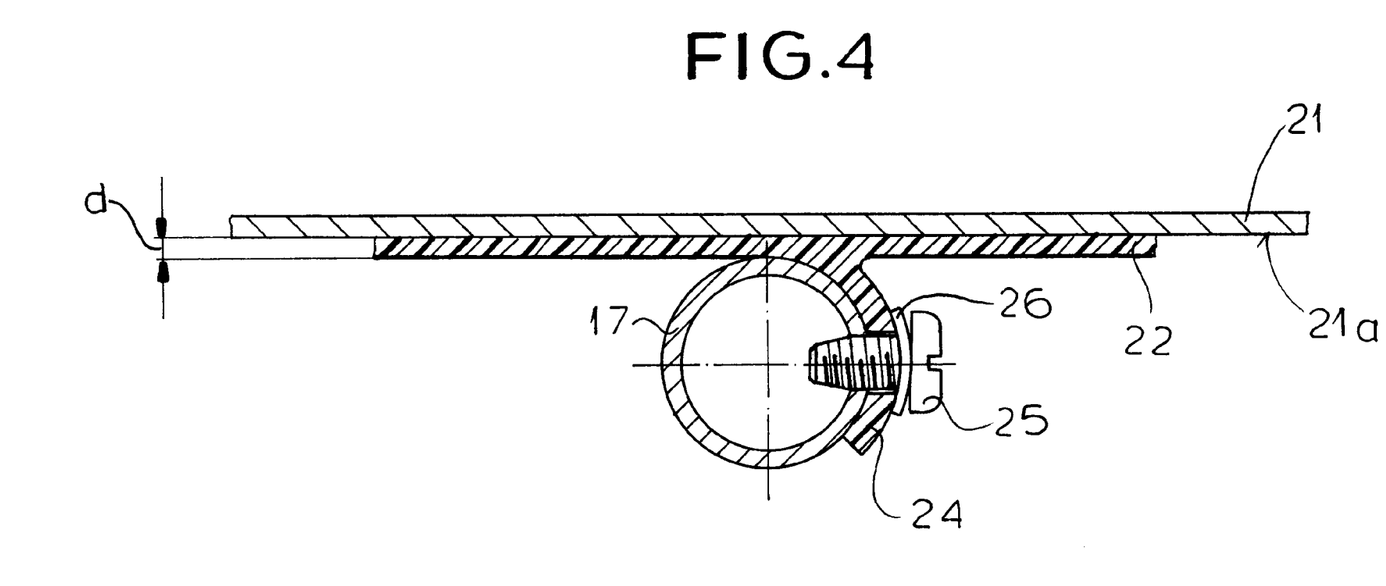
FIGS. 4 and 5 are sections through details of the top.
Figure 5:
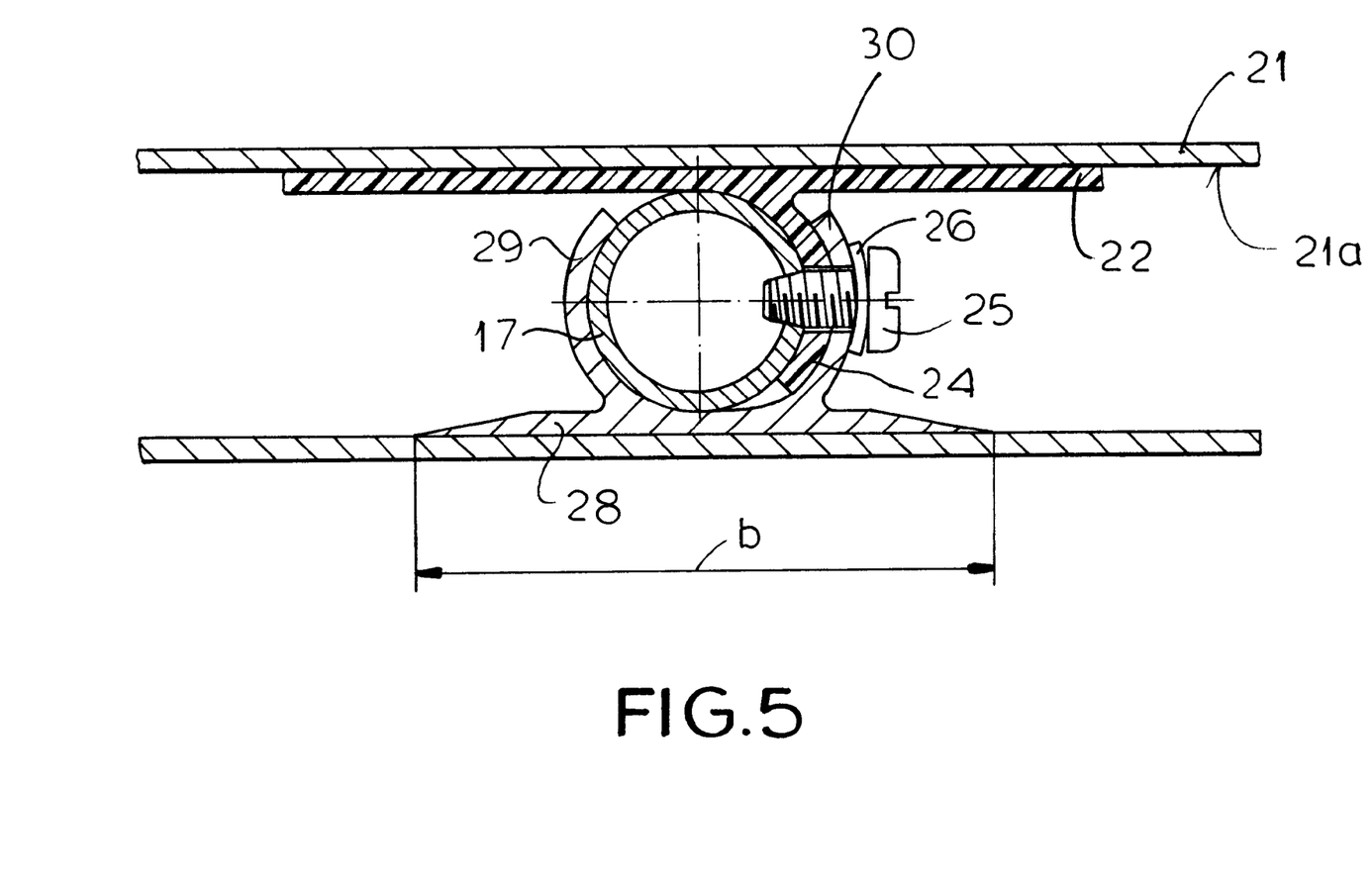

FIG. 4 shows one of the struts 17, here constituted as a metal tube. The insulating layer 22 here is unitarily molded with an inwardly extending flap 24 that wraps partly around the strut 17 and is secured thereto by screws 25 and washers 26. In FIG. 5 a textile roof liner 27 has an inner face 27a to which is bonded a molded plastic mounting strip 28 having a pair of inwardly directed ribs 29 and 30 that embrace the strut 17 and flap 24. The screws 25 also pass through the ribs 30 to secure the liner 27 in place. The strip 28 has a width b equal to about twice the diameter of the strut 17.

Figure 6:
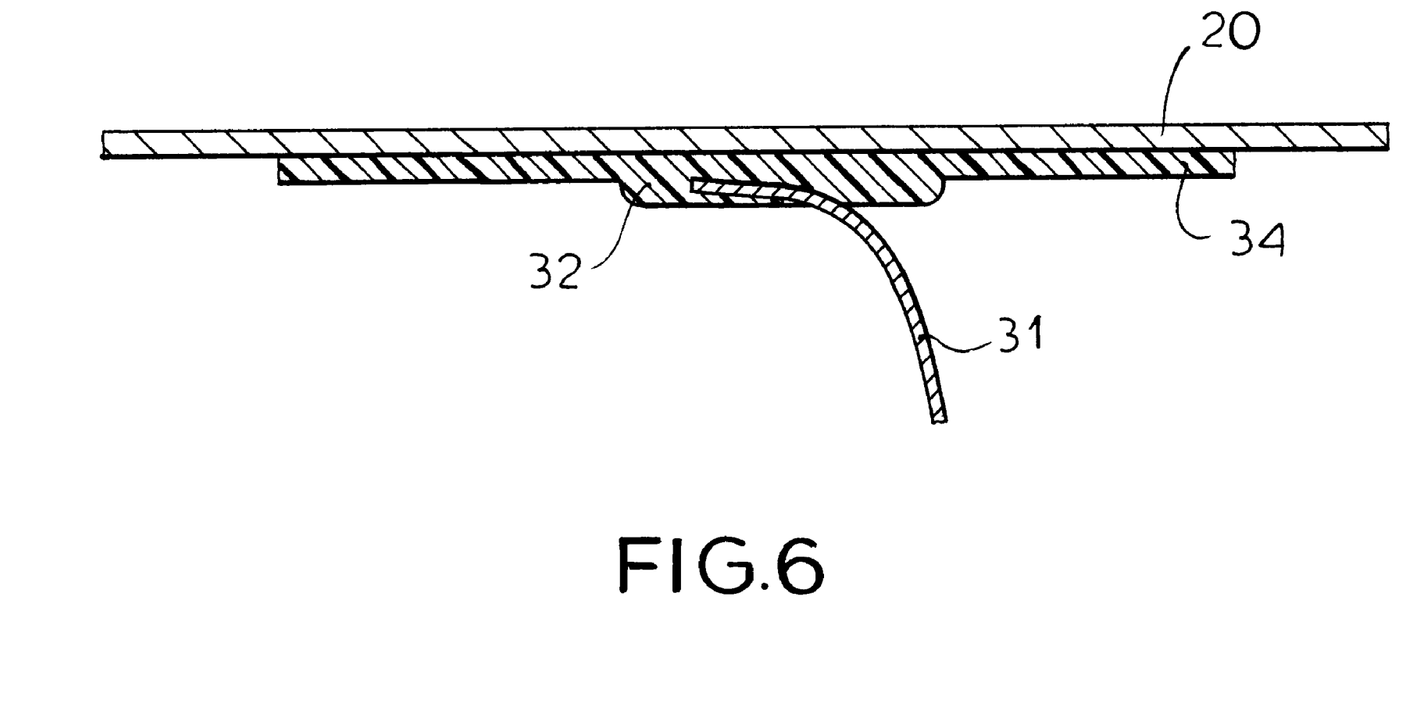
FIGS. 6 and 7 are sections through alternates to the detail of FIG. 4.
Figure 7:
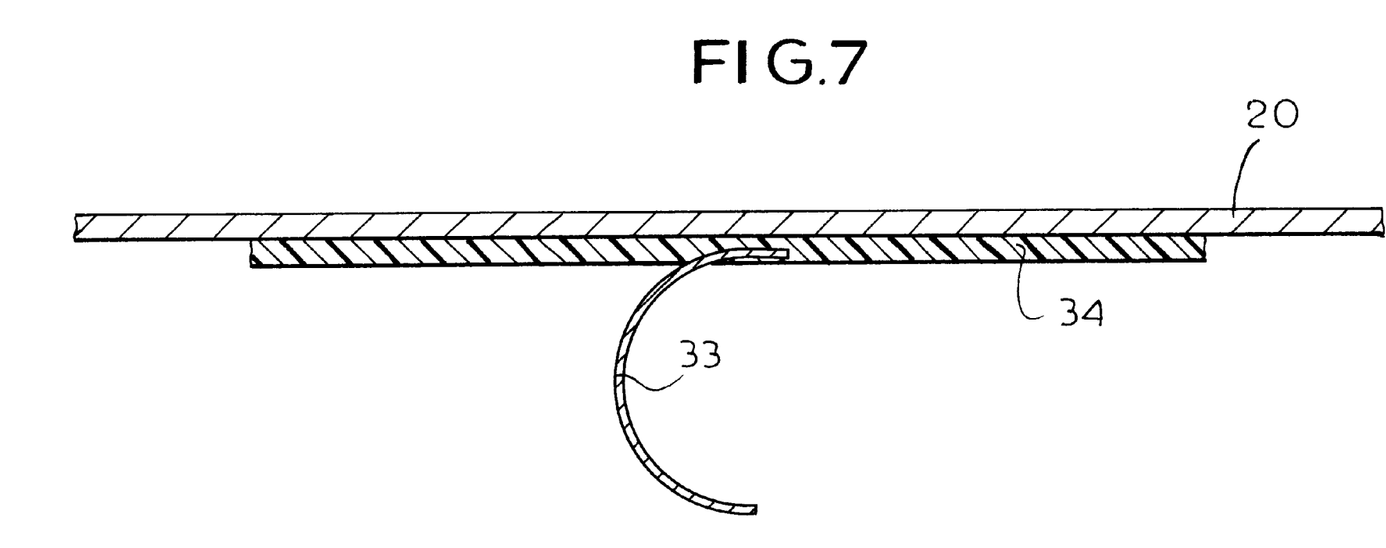

In FIG. 6 a connecting element, here a rubber band 31 is imbedded in a cast-plastic layer 34 having a thickened region 32 where the rubber band 31 is imbedded. In FIG. 7 there is no thickened region and a connecting element 33 of semicircular shape is used. These elements 31 and 33 are looped around and/or otherwise connected to the struts 17.

Figure 8:
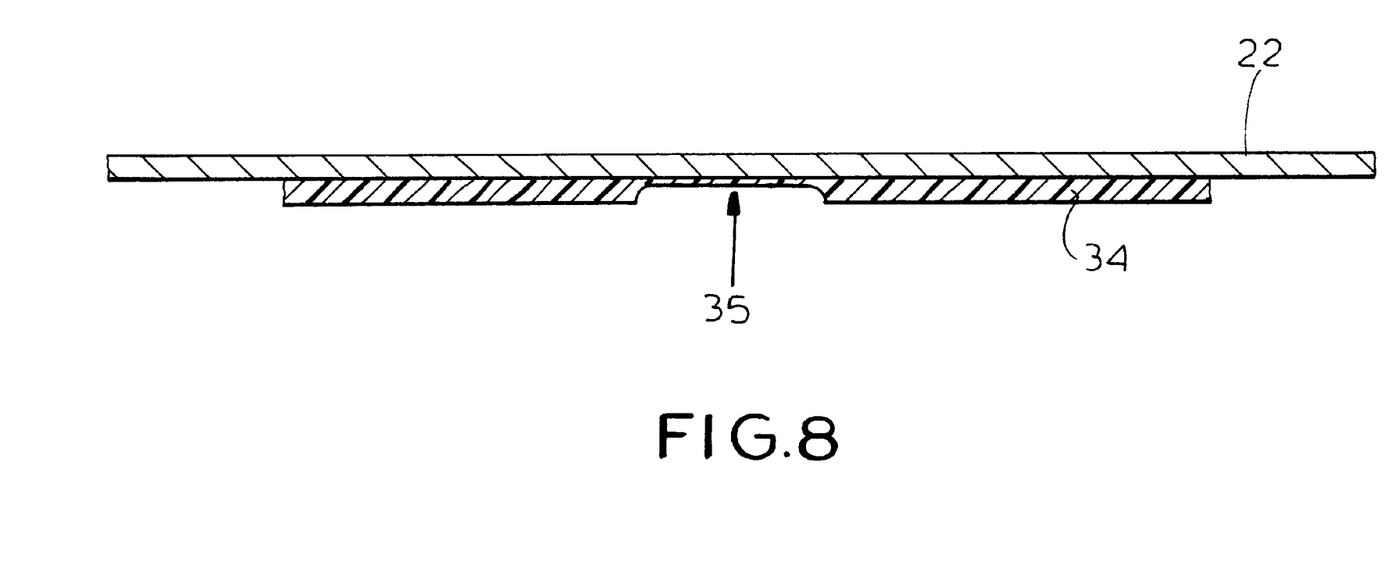
FIG. 8 is a section through another detail of the invention.
Figure 9:
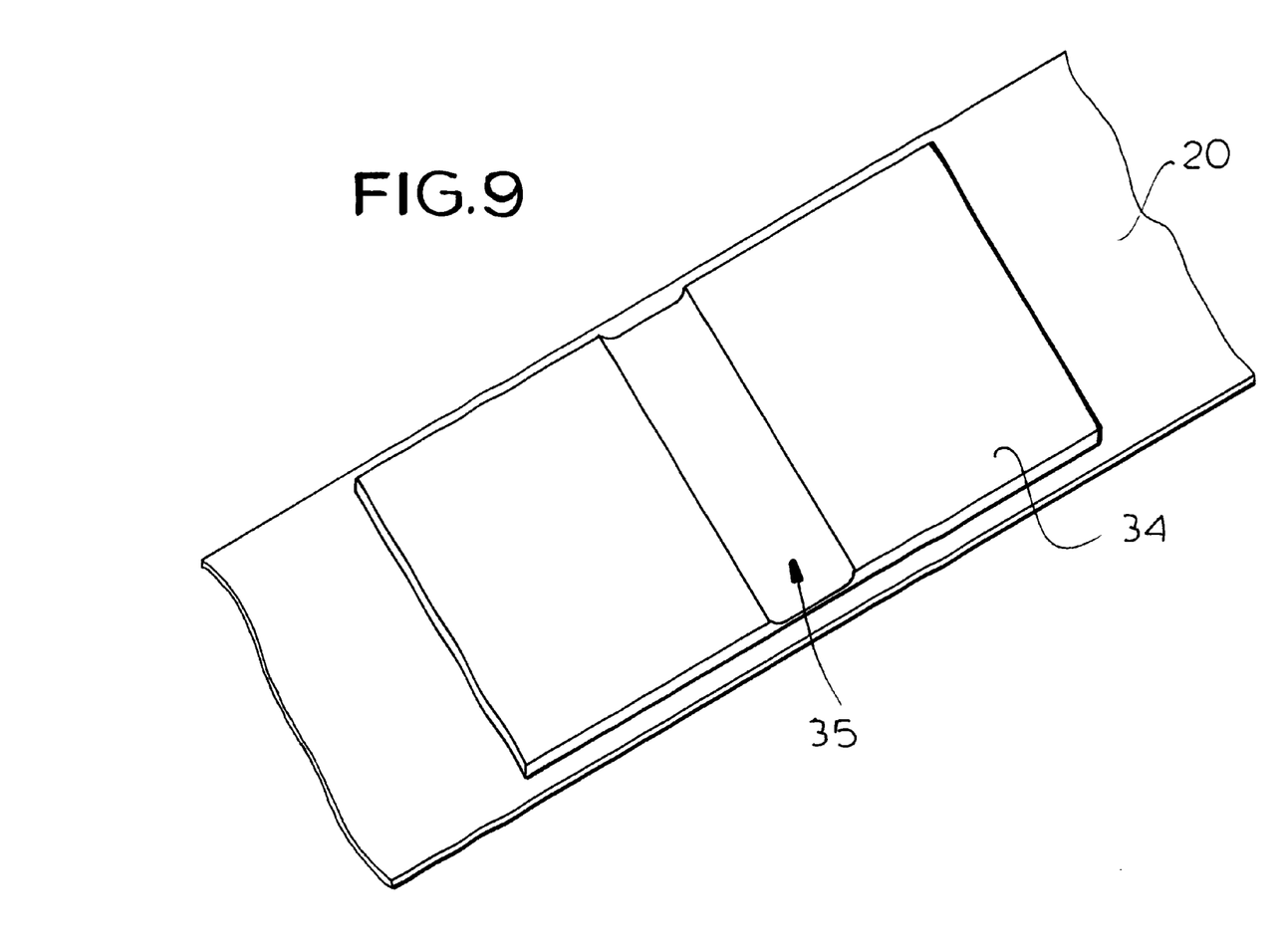
FIG. 9 is a perspective view of a detail of the top in accordance with the invention.

FIG. 8 illustrates the molded-plastic inner layer 34, here formed with a thickness-reduced strip 35 that serves for bending at this region. It is applied to the inner face of the outer layer 22 whereas in FIG. 9 the structure is applied to one of the reinforcing strips 20.

We claim:

1. A motor-vehicle convertible top comprising:

a flexible and waterproof outer layer defining a roof having edges and an inner surface, a pair of sides joined at the edges to the roof, and a rear wall extending between the sides and a rear edge of the roof;

a heat- and sound-insulating inner layer of a foamable plastic bonded directly to the inner surface of the roof and inner surfaces of the sides;

a pair of reinforcing bands extending along the edges and fixed to the layers;

a plurality of crosswise rigid reinforcing struts extending between the bands and secured to the inner layer; and plastic formations molded on the bands and engaged around the struts.

2. The motor-vehicle convertible top defined in claim 1 wherein the outer layer has a textile inner surface to which the inner layer is directly bonded.

3. The motor-vehicle convertible top defined in claim 2 wherein the inner layer is polyurethane.

4. The motor-vehicle convertible top defined in claim 3 wherein the inner layer has a Shore D hardness of about 40 and a polyol:isocyanate ratio of about 100:38 by weight.

5. The motor-vehicle convertible top defined in claim 3 wherein the inner layer has a thickness of between 2 mm and 6 mm.

6. The motor-vehicle convertible top defined in claim 1 wherein the outer layer has seams and the inner layer covers and seals the seams.

7. A motor-vehicle convertible top comprising:

a flexible and waterproof outer layer defining a roof having edges and an inner surface, a pair of sides joined at the edges to the roof, and a rear wall extending between the sides and a rear edge of the roof;

a heat- and sound-insulating inner layer of a foamable plastic bonded directly to the inner surface of the roof and inner surfaces of the sides;

a pair of reinforcing bands extending along the edges, fixed to the layers, and having outer faces turned toward the outer layer and provided with a plastic layer; and a plurality of crosswise rigid reinforcing struts extending between the bands and secured to the inner layer.

8. The motor-vehicle convertible top defined in claim 7 wherein the plastic layer on the bands has interrupted regions, whereby the bands fold readily at the regions.

9. A motor-vehicle convertible top comprising:

a flexible and waterproof outer layer defining a roof having edges and an inner surface, a pair of sides joined at the edges to the roof, and a rear wall extending between the sides and a rear edge of the roof;

a heat- and sound-insulating inner layer of a foamable plastic bonded directly to the inner surface of the roof and inner surfaces of the sides;

a pair of reinforcing bands extending along the edges and fixed to the layers;

a plurality of crosswise rigid reinforcing struts extending between the bands and secured to the inner layer; and formations unitarily formed with the inner layer and fixed to the struts.

10. The motor-vehicle convertible top defined in claim 9 wherein the formations are flaps extending along and engaging the struts.

11. The motor-vehicle convertible top defined in claim 10, further comprising mounting formations fixed to the struts and imbedded in the inner layer.

12. The motor-vehicle convertible top defined in claim 9, further comprising a roof liner having an inner surface provided with bonded plastic strips in turn having formations fixed to the struts.

* * * * *